July 27, 1937.  C. F. GREENBURG  2,087,908
PIPE COUPLING
Filed Dec. 30, 1935
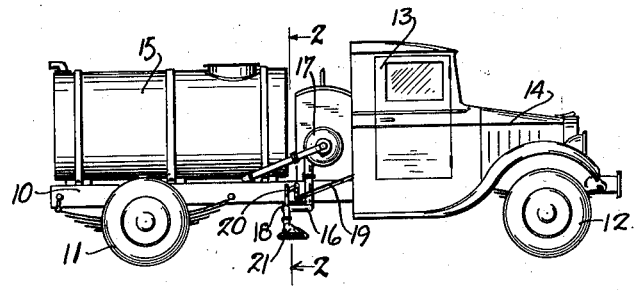
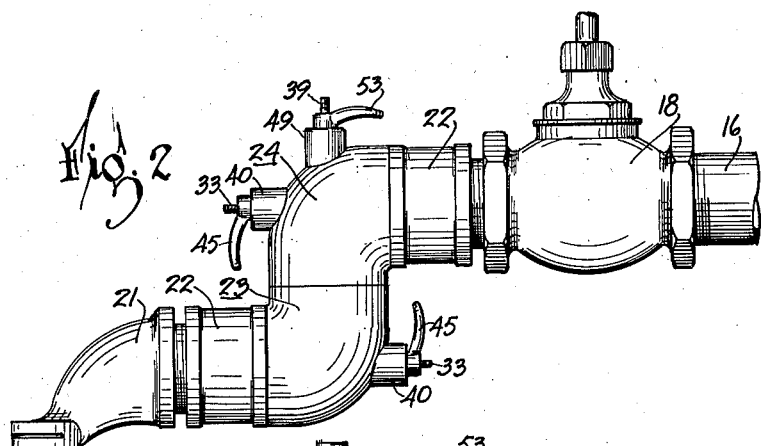
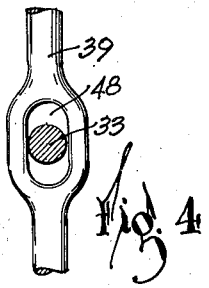
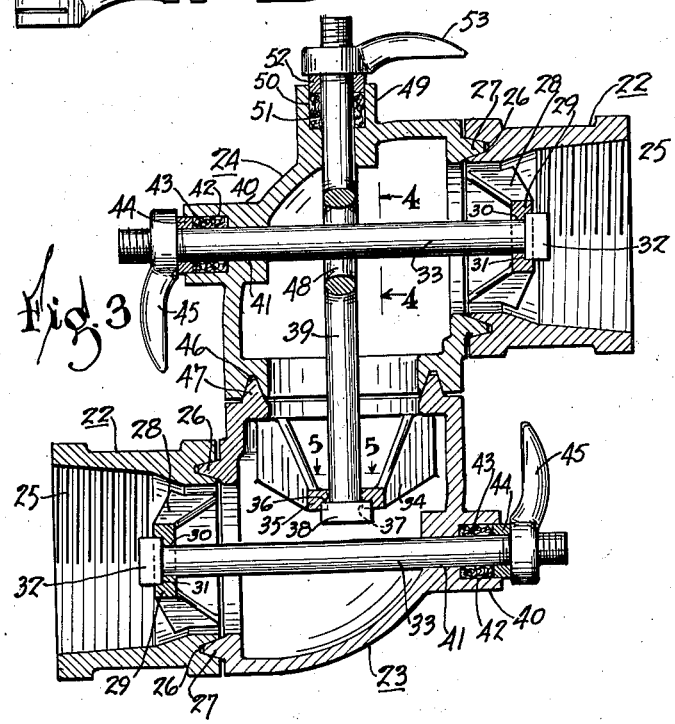
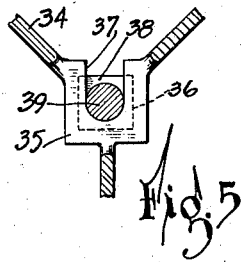
INVENTOR.
Charles F. Greenburg
BY
ATTORNEY.

Patented July 27, 1937

2,087,908

UNITED STATES PATENT OFFICE 2,087,908

PIPE COUPLING

Charles F. Greenburg, South Bend, Ind., assignor to Municipal Supply Company, South Bend, Ind., a corporation of Indiana Application December 30, 1935, Serial No. 56,675

2 Claims. (Cl. 285—104)

This invention relates to road machinery and particularly to improvements in street flushers and the like.

One of the primary objects of my invention is to provide means for connecting the nozzle with the supply line by which the nozzle can be adjusted in any desired position without the use of tools usually supplied for that purpose.

Another object is to provide an adjustable fitting comprising, a plurality of parts which are maintained in operative and selected position by means extending into those parts.

Another object is to provide an adjustable fitting comprising, a pair of elbows which may be rotated relative to each other and locked in the selected position by bolts extending therethrough.

Another object is to provide an adjustable fitting comprising, a pair of elbows and a pair of couplings, each of the couplings having a spider formed therein to receive the head of a bolt which extends through the respective elbows and is locked thereon whereby the couplings and elbows are locked together and their relative positions may be adjusted.

A further object is to provide an adjustable fitting comprising, a pair of elbows seated together and a coupling seated against the other end of each of the elbows, the elbows and couplings being maintained in seated relationship by bolts seated against the coupling and passing through the elbows.

Still a further object is to provide an adjustable fitting interposed between a nozzle and feed line which comprises a plurality of parts adjustable relative to each other to permit adjustment of the nozzle to any desired position, the parts being secured together by means passing therethrough which can be manually operated without the aid of tools for adjusting the respective parts.

Other objects, and objects relating to details of construction and methods of manufacture and operation will be apparent from the drawing and the detailed description to follow.

In the drawing in which like numerals refer to like parts throughout the several views:

Fig. 1 is a diagrammatic side elevational view of a street flusher showing my invention incorporated therein:

Fig. 2 is an enlarged side elevational view of the adjustable fitting forming the subject matter of my invention, the same being taken in the direction of the arrows 2—2 on Fig. 1:

Fig. 3 is a detailed sectional view of the structure shown in Fig. 2 and looking in the same direction:

Fig. 4 is a detailed sectional view of the locking bolts taken on the line 4—4 on Fig. 3:

Fig. 5 is a fragmentary sectional view taken on the line 5—5 on Fig. 4.

In road machinery such as oilers, street flushers and the like, the nozzle through which the liquid is ejected and sprayed onto the road has been connected with the feed line by couplings which would permit of adjusting the position of the nozzle but which required the use of tools for that purpose. When the fittings are loosened to permit adjustment of the same, difficulty was encountered in tightening the locking means because frequently the coupling parts were moved from the selected position during the tightening of the locking elements. I have overcome the objections heretofore encountered in adjusting the nozzle on street flushers and the like by providing means by which the fitting may be adjusted at will and tightened in the selected position without the use of any tools heretofore used and by which the selected position of the coupling parts is not disturbed after they have been moved to the selected position.

In order that others may better understand my invention reference will be had to the accompanying drawing in which I have shown a street flusher comprising, a truck having a frame 10 mounted on driving wheels 11, and steering wheels 12, and on which is mounted a driver's cab 13 forwardly of which is a power plant, not shown, positioned beneath the hood 14. At the rear of the cab 13 is a tank 15 adapted to contain a liquid, such as oil or water, which is fed under pressure to a pipe 16 by a pump 17 driven by any suitable power source. The pipe 16 forming the fuel supply line has a valve 18 therein adapted to be opened and closed by the pull rod 19 operatively connected thereto by the bell crank 20 which rod may be extended to a position to be conveniently operated by the driver of the truck. The street flusher above described forms no part of my invention except as the fitting may be applied thereto and therefor and further detailed description of the same is thought to be unnecessary.

The fitting comprising the subject matter of my invention is interposed between a nozzle 21 and the valve 18 and comprises a pair of couplings 22 which may be identical so that a description of one is sufficient for both, and the elbows 23 and 24. The couplings 22 are internally threaded at 25 to receive the nozzle 21 or a nipple extending from the valve 18 as is clearly shown in Fig. 2.

The end of each of the couplings opposite to the threaded end is provided with a V-shaped groove 26 therein forming a seat for the tongue or male member 27 extending around the end face of either of the elbows 23 or 24, as is shown in Fig. 3. The couplings 22 are each formed with a spider 28 therein having a head 29 formed with a hole 30 and a recess 31 therein in which is seated the head 32 of a bolt 33, the recess 31 preventing rotation of the head 32 on the bolt 33 relative to the spider 28.

The elbow 23 is also formed with a spider 34 therein which has a head 35 formed with a recess 36 and a slot 37 therein to receive the head 38 of a bolt 39 which extends through the elbow 24 for a purpose to be hereinafter described. The elbow 23 has a boss 40 thereon having an opening 41 therethrough in line with the head 29 on the spider 28 through which one of the bolts 33 may be inserted. The boss 40 is drilled out at 42 to receive the packing 43, there being a washer 44 interposed between the packing 43 and the locking handle 45. The bolt 33 is positioned with its head 32 in the recess 31 formed in the head 29 of the spider 28 formed in the coupling 22 with its threaded end extending through the opening 41 in the boss 40 so that the locking handle 45 may be rotated to lock the coupling 22 and the elbow 23 together forming a watertight seal therebetween because of the male member 27 seating in the recess 26 and the packing 43 preventing any leakage around the bolt 33.

As previously explained, the other coupling 22 is fitted against the elbow 24 in the same manner as the coupling 22 is seated against the elbow 23 and the coupling and elbow are locked together by a bolt 33 in the same manner as previously explained so that like numerals have been applied to like parts and a further description of the same is thought to be unnecessary.

The elbow 24 is provided with a recess or female member 46 in which is seated a tongue or male member 47 extending from the face of the elbow 23 so that the elbows 23 and 24 can be seated one against the other to prevent leakage therebetween. As the bolt 33 extending through the elbow 24 is in the same vertical plane and at right angles to the bolt 39 which secures the elbows 23 and 24 together, the bolt 39 is provided with a slot 48 therein so that the bolt 33 may pass therethrough to permit tightening of the elbow 24 on the elbow 23 without disturbing the tightening of the coupling 22 thereon. The elbow 24 is provided with a boss 49 through which the threaded end of the bolt 39 extends and has a recess 50 in which is positioned packing 51, there being a washer 52 interposed between the packing 51 and the locking handle 53 whereby a watertight seal is provided around the bolt 39.

From the foregoing description it will be seen that with a coupling 22 seated on the male member 27 extending from the elbow 23 and the elbow 24 seated on the elbow 23 and a second coupling 22 seated on the male member 27 extending from the elbow 24, that when the respective parts are properly drawn together by the bolts 33 and 39 that no leakage therebetween will occur. It will also be seen that by loosening the locking handles 45 on the bolts 33 that the elbows can be rotated relative to the couplings 22 to thus change the position of the nozzle 21 and also the locking handle 53 on the bolt 39 can be loosened to adjust the elbows 23 and 24 relative to each other to thereby adjust the nozzle in another direction so that the nozzle 21 can be adjusted to any desired position relative to the feed line 16 merely upon loosening the locking handles on the respective bolts and that the respective locking handles can be tightened on the bolts and the parts locked in the adjusted position upon the tightening of the locking handles without disturbing the adjusted positions of the elbows or couplings.

While I have shown my invention for use in connection with a nozzle used on a street flusher, it will be understood that the fitting herein described may be used for other purposes, as the drawing is illustrative only and not as limiting my invention and therefore the invention is to be limited only by the scope of the sub-joined claims.

What I claim is:

1. A feed line fitting comprising, a coupling secured to said feed line, an elbow seating against the end of said coupling opposite to said feed line, a bolt extending through said coupling and elbow for securing the same together and permitting adjustment of positions therebetween, a second elbow seating against the end of said first elbow opposite to said coupling, a bolt extending through said elbows for securing the same together and permitting adjustment of positions therebetween, one of said bolts having a slot therein to permit the other bolt to pass therethrough, a coupling seating against the end of said second elbow opposite to said first elbow, and a bolt extending through said last coupling and second elbow for securing the same together and permitting adjustment of positions therebetween.

2. A feed line fitting comprising, a pair of couplings each having a spider provided with a slotted head therein, an elbow seating against each of said couplings, a bolt having a head seating in one of said slotted heads extending through said elbows, means on each of said bolts for clamping the elbows and couplings together, a spider having a slotted head in one of said elbows, and a bolt having a head seating in said slotted head in said elbow extending through the other elbow, and means on said bolt for clamping said elbows together, said last named bolt having a slot therein to permit one of said first named bolts to pass therethrough.

CHARLES F. GREENBURG.